(12) United States Patent
Teo

(10) Patent No.: US 6,349,153 B1
(45) Date of Patent: Feb. 19, 2002

(54) METHOD AND SYSTEM FOR COMPOSITION IMAGES

(75) Inventor: Patrick Teo, Redwood City, CA (US)

(73) Assignee: MGI Software Corporation, Richmond Hill (CA)

( * ) Notice: Subject to any disclaimer, the term of this patent is extended or adjusted under 35 U.S.C. 154(b) by 0 days.

(21) Appl. No.: 09/542,149

(22) Filed: Apr. 4, 2000

Related U.S. Application Data

(62) Division of application No. 08/922,732, filed on Sep. 3, 1997, now Pat. No. 6,128,108.

(51) Int. Cl.$^7$ .................................. G06K 9/32
(52) U.S. Cl. ............ 382/294; 382/151; 382/284; 358/450
(58) Field of Search ................ 382/181, 284, 382/294, 293, 151; 358/450, 452; 348/699

(56) References Cited

U.S. PATENT DOCUMENTS

| | | | |
|---|---|---|---|
| 5,022,085 A | 6/1991 | Cok | 382/1 |
| 5,155,586 A | 10/1992 | Levy et al. | 358/54 |
| 5,185,808 A | 2/1993 | Cok | 382/1 |
| 5,231,385 A | 7/1993 | Gengler et al. | 340/703 |
| 5,251,022 A | 10/1993 | Kitamura | 358/528 |
| 5,325,449 A | 6/1994 | Burt et al. | 382/56 |
| 5,398,079 A * | 3/1995 | Liu et al. | 348/699 |
| 5,488,674 A | 1/1996 | Burt et al. | 382/284 |
| 5,581,377 A | 12/1996 | Shimizu et al. | 358/540 |
| 5,611,000 A * | 3/1997 | Szeliski et al. | 382/294 |
| 5,630,037 A | 5/1997 | Schindler | 395/131 |
| 5,649,032 A | 7/1997 | Burt et al. | 382/284 |
| 5,745,121 A | 4/1998 | Politis | 345/433 |
| 5,815,645 A | 9/1998 | Fredlund et al. | 358/540 |
| 5,838,387 A * | 11/1998 | Hirosawa et al. | 382/294 |
| 5,982,941 A * | 11/1999 | Loveridge et al. | 382/284 |
| 5,982,951 A | 11/1999 | Katayama et al. | 382/284 |
| 6,075,905 A * | 6/2000 | Herman et al. | 382/294 |
| 6,128,416 A * | 10/2000 | Oura | 382/284 |

OTHER PUBLICATIONS

Product Information from ERDAS taken from the Internet site http://www.erdas.com on Sep. 7, 1997.
Brochure: ERDAS—Mosaic Tool.

* cited by examiner

Primary Examiner—Jon Chang
Assistant Examiner—Jingge Wu
(74) Attorney, Agent, or Firm—Blakely, Sokoloff, Taylor & Zafman

(57) ABSTRACT

A method for composition of two digital images which overlap in an overlapping pixel region, including adjusting the pixel color values of at least one of the digital images so as to produce resulting digital images including at least one modified digital image, and combining the resulting digital images in the overlapping pixel region by taking weighted averages of their pixel color values. There is also described a method for feathering two digital images which overlap in an overlapping pixel region, including aligning the digital images so as to approximately register them in the overlapping pixel region, determining three curves, one of which is a leftmost curve, another of which is a middle curve and another of which is a rightmost curve, and at least one of which is not a straight vertical line, the curves extending from the top to the bottom of the overlapping pixel region and lying within the overlapping pixel region, and the middle curve lying between the leftmost and the rightmost curve, and combining the digital images by taking a weighted average of the pixel color values, in such a way that the weights used are a value above 50% of image A and a value below 50% of image B to the left of the leftmost curve, 50% of image A and 50% of image B along the middle curve, and a value below 50% of image A and a value above 50% of image B to the right of the rightmost curve. Systems for carrying out the methods are also described.

12 Claims, 9 Drawing Sheets

(5 of 9 Drawing Sheet(s) Filed in Color)

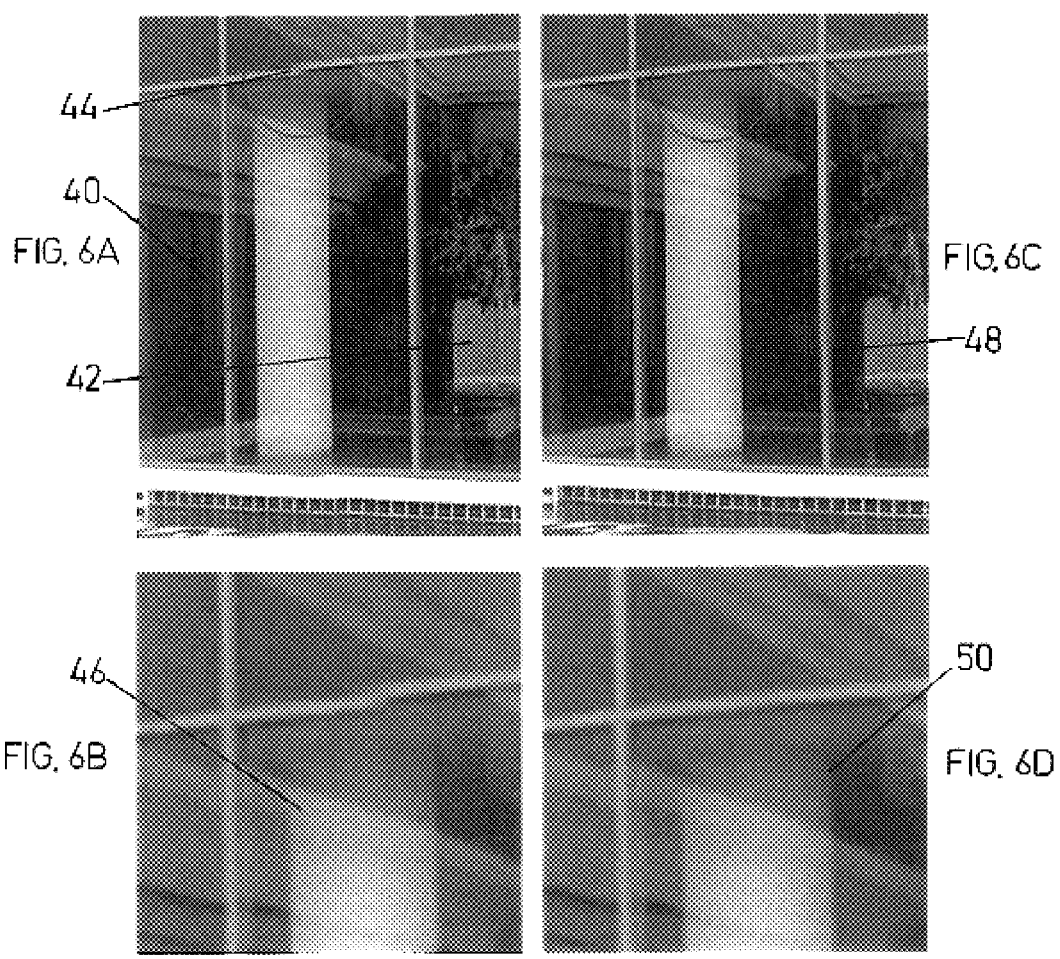

METHOD AND SYSTEM FOR COMPOSITION IMAGES

This application is a divisional of U.S. patent application Ser. No. 08/922,732 filed Sep. 3, 1997, now U.S. Pat. No. 6,128,108.

FIELD OF THE INVENTION

The present invention relates to digital image processing.

BACKGROUND OF THE INVENTION

The following U.S. Patents have been found in a U.S. Patent Search and are believed to be generally relevant to the field of the invention:

| | | |
|---|---|---|
| 5,022,085 | 6/91 | Cok |
| 5,155,586 | 10/92 | Levy at al. |
| 5,185,808 | 2/93 | Cok |
| 5,231,385 | 7/93 | Gengler et al. |
| 5,251,022 | 10/93 | Kitamura |
| 5,325,449 | 6/94 | Burt et al. |
| 5,488,674 | 1/96 | Burt et al. |
| 5,630,037 | 5/97 | Schindler |
| 5,649,032 | 7/97 | Burt et al. |

Digital photographs with extended fields of view are conventionally created using an image processing technique known as "stitching", wherein a user takes multiple photographic images using a camera and rotates the camera between images, so as to produce overlapping photos spanning an entire vista. A "stitcher" then combines the various images into a single large "omniview" image with an extended field of view, up to a full 360°. The stitching process itself involves various steps, such as correction of the images for camera angle and tilt, image alignment between successive images to account for overlap, and texture mapping. When performed accurately and properly viewed with appropriate perspective correction, the resulting large image gives the viewer the experience of being immersed within a vista.

Although certain professional lenses, such as fisheye lenses, are capable of photographing an entire hemispherical view as a single image, use of a stitcher enables a non-professional photographer to use a standard lens, and yet capture the same extended wide angle view. The computational processing within the stitcher effectively carries out necessary three-dimensional geometrical transformations to account for the non-linear distortion in a wide angle view. Specifically, it projects the various linear images onto the surface of a sphere or cylinder or cube—depending on a desired environment map.

One commonly encountered source of artifacts in stitching is the variable lighting of individual images. As the camera rotates, for example, one image can be taken into the sun, and thus deviate from the other images with respect to lighting. When this image is stitched with the others, it stands out awkwardly.

Current state of the art stitchers use a process known as "feathering" to merge together a left image (hereinafter designated as "image A") and an adjacent right image (hereinafter designated "image B"). Typical implementations of feathering operate after the images are aligned and the overlap region has been identified. They then feather the two images within the overlap region, by weighted combining using weights which vary from a value above 50% (e.g. 100%) of image A and a value below 50% (e.g. 0%) image B at the left side of the overlap region, to a value below 50% (e.g. 0%) of image A and a value above 50% (e.g. 100%) of image B at the right side of the overlap region. However, if the lighting conditions of the two images are substantially at variance and the overlap region is narrow, this technique of feathering does not work well, and typically produces noticeable bands at the overlap region. This is to be expected, since feathering does not affect pixel color values outside of the overlapping region.

Another common artifact, referred to as "ghosting," occurs when two images being blended together are slightly misaligned. Suppose, for example, that the overlap region contains a bright square of dimensions 1"x1". If the two images are mis-aligned horizontally by 0.1", then feathering will produce an elongated square (i.e. a rectangle) of dimensions 1.1"x1". Moreover the leftmost and rightmost strips of the rectangle, of dimensions 0.1"x1", will be less bright than the rest of the rectangle. The appearance of these less bright strips at the left and right ends of the rectangle gives the effect of ghosting, whereby only a partial remnant of the square is present. It should be emphasized that alignment is practically never perfect, and as such, there is always some form of ghosting present.

Another source of ghosting occurs when an object is present in one of the images and absent in the other. For example, a person might appear in image A and be absent from image B, having moved out of sight between the times the two images were photographed.

SUMMARY OF THE INVENTION

The present invention provides a novel approach to image feathering of two overlapping images (hereinafter designated "image A" and "image B") which avoids both of the artifacts described above; namely, noticeable bands at the overlap regions due to different lighting conditions in adjacent images, and ghosting due to misalignment. This approach preferably involves four stages of image processing.

A first stage is that of aligning the two images so as to register them as best as possible in the overlap region. This stage is not addressed in the present invention. Rather, the present invention relates to the image processing after the alignment is performed, using any conventional method.

A second stage involves vertical image warping, specially constructed so as to eliminate any vertical misalignment between the two images. Optimal vertical distortions for image A are calculated along selected vertical lines within the overlap region so as to minimize vertical mis-match with respect to image B. In between and outside of these selected vertical lines, the vertical distortions are filled in by linear interpolation. The result is a two-dimensional vertical distortion map for image A which brings it into vertical alignment with image B.

A third stage uses the information in the overlap region to correct the color of the two images, prior to carrying out the feathering. Popular belief tends to support the idea that the best way to take pictures with a camera in order to stitch them together, is to minimize the overlap between them, so that they can be stitched together end-to-end. On the contrary, the present invention builds upon information in the overlap region to correct the color in each of the images, in order to bring both images to equivalent lighting conditions. Thus the larger is the overlap region, the more of an information base is available for the color correction.

Once the images are color corrected, their variation due to different lighting conditions is reduced, and as a result the feathering is smoother. Even if conventional "feathering" is used, the banding artifact is significantly reduced. The present invention tapers the color correction, so that full color correction is applied within the overlap region, and outside the overlap region only a fraction of the correction is applied, where the fraction preferably tapers from 100% to 0% as the pixel distance from the overlap region increases. Normally, the color correction is not applied at all for pixels sufficiently far away from the overlap region.

A fourth stage involves a new form of feathering, which varies the relative weights of the A and B image pixels along a multitude of horizontal lines, from a value above 50% of A and a value below 50% of B at a left endpoint to 50% of A and 50% of B at a middle point, to a value below 50% of A and a value above 50% of B at a right endpoint. The horizontal lines cover the entire overlap region, from the top to the bottom.

Three control points are defined for each horizontal line—left endpoint, middle point and right endpoint. The locations of these points typically vary from one horizontal line to the next. The collection of left endpoints forms a downward running curve, designated as the "leftmost curve," the collection of middle points forms a downward running curve, designated as the "middle curve," and the collection of right endpoints forms a downward running curve, designated as the "rightmost curve." The region between the leftmost and rightmost curves becomes the "feathering region." Whereas in conventional feathering the feathering region is precisely the overlap region, which is rectangular, in the current invention the feathering region is typically non-rectangular, and lies strictly within the overlap region.

The present invention avoids ghosting by approximately aligning the two images, and then carefully choosing the leftmost and rightmost curves, so that the feathering region is as large as possible, but without containing any pixels where the two images are significantly misaligned. Misalignment can be recognized by the difference between image A and image B in the overlap region. Large differences in any of the color values indicate significant misalignment. Precisely, specific threshold values are used to indicate whether or not misalignment is "significant."

The present invention preferably first seeks a middle curve which travels downward from top to bottom, without passing through any pixels where the images are significantly misaligned. After the middle curve is found, the present invention seeks outward horizontally, left and right, from each point on the middle curve, to find the extent for which there is no significant misalignment. The limits of these extents are taken as initial candidates for the leftmost and rightmost curves. These candidate curves can be very erratic curves, and can be subsequently smoothed.

There is thus provided in accordance with a preferred embodiment of the present invention a method for compositing two digital images which overlap in an overlapping pixel region, including adjusting the pixel color values of at least one of the overlapping images, so as to produce resulting digital images including at least one modified digital image, and combining the resulting digital images in the overlapping pixel region by taking weighted averages of their pixel color values.

Additionally in accordance with a preferred embodiment of the present invention the adjusting step adjusts the pixel color values of at least one of the digital images in a pixel region which includes the overlapping pixel region.

Moreover in accordance with a preferred embodiment of the present invention the adjusting step adjusts the pixel color values of at least one of the digital images in a pixel region which includes pixels outside the overlapping region.

Further in accordance with a preferred embodiment of the present invention the pixel color values are in RGB three-channel format, and the adjusting step is applied to at least one color channel.

Still further in accordance with a preferred embodiment of the present invention the adjusting step includes modifying brightness, contrast and gamma factors of each of the digital images so as to produce modified brightness, contrast and gamma factors, denoted by $\alpha$, $\beta$ and $\gamma$, respectively; and applying the modified brightness, contrast and gamma factors by changing the color intensity, denoted by I, of at least one of the digital images to a modified color intensity, denoted by I', according to the formula $$I' = \alpha + \beta \cdot I^\gamma.$$

Additionally in accordance with a preferred embodiment of the present invention the applying step includes constructing a lookup table which tabulates the changes in color intensity $\Delta I = I' - I$ indexed by I, and accessing the look-up table to modify the color intensities.

Moreover in accordance with a preferred embodiment of the present invention the changes in brightness, contrast and gamma factors produced by the applying step are applied with a weighting factor, the weighting factor tapering off from a value above 50% to a value below 50% over a pixel region outside of and adjacent to the overlapping pixel region.

There is also provided in accordance with a preferred embodiment of the present invention a method for feathering two digital images which overlap in an overlapping pixel region, including aligning the digital images so as to approximately register them in the overlapping pixel region, determining three curves, one of which is a leftmost curve, another of which is a middle curve and another of which is a rightmost curve, and at least one of which is not a straight vertical line, the curves extending from the top to the bottom of the overlapping pixel region and lying within the overlapping pixel region, and the middle curve lying between the leftmost and rightmost curves, and combining the digital images by taking a weighted average of the pixel color values, in such a way that the weights used are a value above 50% of image A and a value below 50% of image B to the left of the leftmost curve, 50% of image A and 50% of image B along the middle curve, and a value below 50% of image A and a value above 50% of image B to the right of the rightmost curve.

Further in accordance with a preferred embodiment of the present invention the middle curve is halfway between the leftmost and rightmost curves.

Still further in accordance with a preferred embodiment of the present invention the middle curve is determined in such a way so as to avoid its passing through any portion of the overlapping pixel region where there is substantial misalignment between the digital images.

Additionally in accordance with a preferred embodiment of the present invention the middle curve is determined by using an optimization algorithm, generally optimized so as to have the least amount of misalignment between the digital images along its path.

Moreover in accordance with a preferred embodiment of the present invention the optimization algorithm used is a dynamic programming algorithm.

Further in accordance with a preferred embodiment of the present invention the leftmost and rightmost curves are determined by delineating a pixel zone surrounding the middle curve wherein there is no substantial misalignment between the digital images, determining the leftmost and rightmost curves in such a way so as to be as far away as possible from the middle curve, yet remaining within the pixel zone.

Still further in accordance with a preferred embodiment of the present invention the pixel zone is delineated to be as wide as possible, without containing any pixels where there is substantial misalignment between the digital images.

Additionally in accordance with a preferred embodiment of the present invention the leftmost and rightmost curves are determined by using optimization algorithms, optimized so as to be smooth and as far away as possible from the middle curve.

Moreover in accordance with a preferred embodiment of the present invention the optimization algorithms used are dynamic programming algorithms.

There is also provided in accordance with a preferred embodiment of the present invention a method for aligning a first digital image with a second digital image which overlaps with it in an overlapping pixel region, including determining a two-dimensional table of pixel displacements for each pixel location in the first image, and replacing the color values in the first image at each source pixel location in the first image with the color value of the pixel displaced from the source pixel location by the pixel displacement for the source pixel location.

Moreover in accordance with a preferred embodiment of the present invention the pixel displacements are constrained to be zero at at least one side of the first image.

Additionally in accordance with a preferred embodiment of the present invention the pixel displacements are vertical displacements.

Further in accordance with a preferred embodiment of the present invention the determining step includes calculating pixel displacements along multiple vertical lines of pixel locations within the overlapping pixel region, and interpolating horizontally to calculate pixel displacements at pixel locations not situated on the vertical lines.

Still further in accordance with a preferred embodiment of the present invention the pixel displacements are calculated along each of the multiple vertical lines by using a dynamic programming optimization algorithm.

There is also provided in accordance with a preferred embodiment of the present invention a system for composition of digital images which overlap in an overlapping pixel region, including a digital color processor adjusting the pixel color values of at least one of the digital images, so as to produce resulting digital images including at least one modified digital image, and a pixel processor combining the resulting digital images in the overlapping pixel region by taking weighted averages of their pixel color values.

Additionally in accordance with a preferred embodiment of the present invention the digital color processor adjusts the pixel color values of at least one of the digital images in a pixel region which includes the overlapping pixel region.

Moreover in accordance with a preferred embodiment of the present invention the digital color processor adjusts the pixel color values of at least one of the digital images in a pixel region which includes pixels outside the overlapping region.

Further in accordance with a preferred embodiment of the present invention the pixel color values are in RGB three-channel format, and the digital color processor operates on at least one channel.

Still further in accordance with a preferred embodiment of the present invention the digital color processor includes a color parameter processor modifying brightness, contrast and gamma factors of each of the digital images so as to produce modified brightness, contrast and gamma factors, denoted by $\alpha$, $\beta$ and $\gamma$, respectively, and an image processor applying the modified brightness, contrast and gamma factors by changing the color intensity, denoted by I, of at least one of the digital images to a modified color intensity, denoted by I', according to the formula $$I' = \alpha + \beta \cdot I^\gamma.$$

Additionally in accordance with a preferred embodiment of the present invention the image processor includes a calculator constructing a lookup table which tabulates the changes in color intensity $\Delta I = I' - I$ indexed by I, and a data retriever accessing the lookup table to modify the color intensities.

Moreover in accordance with a preferred embodiment of the present invention the changes in brightness, contrast and gamma factors produced by the color parameter processor are applied with a weighting factor, the weighting factor tapering off from a value above 50% to a value below 50% over a pixel region outside of and adjacent to the overlapping pixel region.

There is also provided in accordance with a preferred embodiment of the present invention a system for feathering two digital images which overlap in an overlapping pixel region, including a digital image aligner aligning the digital images so as to approximately register them in the overlapping pixel region, an image processor determining three curves, one of which is a leftmost curve, another of which is a middle curve and another of which is a rightmost curve, and at least one of which is not a straight vertical line, the curves extending from the top to the bottom of the overlapping pixel region and lying within the overlapping pixel region, and the middle curve lying between the leftmost and rightmost curves, and a pixel processor combining the digital images by taking a weighted average of the pixel color values, in such a way that the weights used are a value above 50% of image A and a value below 50% of image B to the left of the leftmost curve, 50% of image A and 50% of image B along the middle curve, and a value below 50% of image A and a value above 50% of image B to the right of the rightmost curve.

Further in accordance with a preferred embodiment of the present invention the middle curve is halfway between the leftmost and rightmost curves.

Still further in accordance with a preferred embodiment of the present invention the middle curve is determined by the image processor in such a way so as to avoid its passing through any portion of the overlapping pixel region where there is substantial misalignment between the digital images.

Additionally in accordance with a preferred embodiment of the present invention the middle curve is determined by the image processor by using an optimization algorithm, generally optimized so as to have the least amount of misalignment between the digital images along its path.

Moreover in accordance with a preferred embodiment of the present invention the optimization algorithm used is a dynamic programming algorithm.

Further in accordance with a preferred embodiment of the present invention the image processor determining the leftmost and rightmost curves includes a zone processor delineating a pixel zone surrounding the middle curve wherein there is no substantial misalignment between the digital images, and a curve processor determining the leftmost and rightmost curves in such a way so as to be as far away as possible from the middle curve, yet remaining within the pixel zone.

Still further in accordance with a preferred embodiment of the present invention the zone processor delineates the pixel zone in such as way so as to make it as wide as possible, substantially without containing any pixels where there is substantial misalignment between the digital images.

Additionally in accordance with a preferred embodiment of the present invention the curve processor determines the leftmost and rightmost curves by using optimization algorithms, optimized so as to make the curves smooth and as far away as possible from the middle curve.

Moreover in accordance with a preferred embodiment of the present invention the optimization algorithms used are dynamic programming algorithms.

There is also provided in accordance with a preferred embodiment of the present invention a system for aligning a first digital image with a second digital image which overlaps with it in an overlapping pixel region, including a processor determining a two-dimensional table of pixel displacements for each pixel location in the first image, and an image writer replacing the color values in the first image at each source pixel location in the first image with the color value of the pixel displaced from the source pixel location by the pixel displacement for the source pixel location.

Moreover in accordance with a preferred embodiment of the present invention the pixel displacements are constrained to be zero at at least one side of the first image.

Additionally in accordance with a preferred embodiment of the present invention the pixel displacements are vertical displacements.

Further in accordance with a preferred embodiment of the present invention the processor includes a calculator calculating pixel displacements along multiple vertical lines of pixel locations within the overlapping pixel region, and an interpolator interpolating horizontally to calculate pixel displacements at pixel locations not situated on the vertical lines.

Still further in accordance with a preferred embodiment of the present invention the calculator operates by using a dynamic programming optimization algorithm.

Throughout the specification and claims, positional and directional terms such as up, down, right, left, top and bottom have been used for the purpose of explaining relationships between various images and portions thereof. It is to be appreciated that these terms are to be considered as being relative only and that, for example top and bottom refers equally to right and left and that the present invention is not limited by the relative positions or directions of images, portions of images, curves or lines constructed thereon. For example, images may be stitched together vertically rather than horizontally as described in the specification.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIGS. 6A–6D are composite images which illustrate operation the warping system of the present invention.

DETAILED DESCRIPTION OF PREFERRED EMBODIMENTS

In digital stitching applications, multiple overlapping photographic images of a scene are taken, each image from a different camera position. The images are digitized, and automatically aligned and merged together, so as to cover an extended view angle, up to 360°. In addition, the images are projected onto a sphere or cylinder or cube, or other geometrical object, in order to provide a three-dimensional omniview.

Aligning the images involves digital image processing, and typically uses a metric such as coefficient of correlation to measure "goodness-of-fit." Some degree of misalignment is always to be expected. Coefficient of correlation is an appropriate metric, because it is invariant to linear color adjustments. Specifically, if the images are darkened or lightened, then the coefficient of correlation remains invariant—which is a desirable feature, since the alignment should not be affected by darkening or lightening.

Merging the images involves combining the respective pixel color values in the rectangular region of overlap, so as to come up with a single combined image. In distinction to aligning, merging is impacted by changes in darkness or lightness, as the combined image reflects a side-by-side view of the two images. Specifically, if the images were taken under different lighting conditions, then merging the images together can lead to severe artifacts typified by awkward coloration bands in the vicinity of the overlap region.

State of the art technology for merging two images, designated as "image A" and "image B," uses a technique known as "feathering," which computes a weighted combination of the pixel values of image A and image B in the rectangular overlap region. Specifically, if $I_A(x,y)$ and $I_B(x,y)$ denote the intensities of a color channel for image A and image B at a common pixel location (x,y) within the overlap region, then the combined image intensity is given by $$I_{AB}(x,y)=w(x)I_A(x,y)+[1-w(x)]I_B(x,y) \qquad (1)$$

The weight factor, w(x), varies from 1 to 0 linearly with horizontal position (i.e. x), with w=1 at the image A side of the overlap region, say the left end x=0, and w=0 at the image B side, say the right end x=W, where W denotes the total width in pixels of the overlap region.

Figure 1:
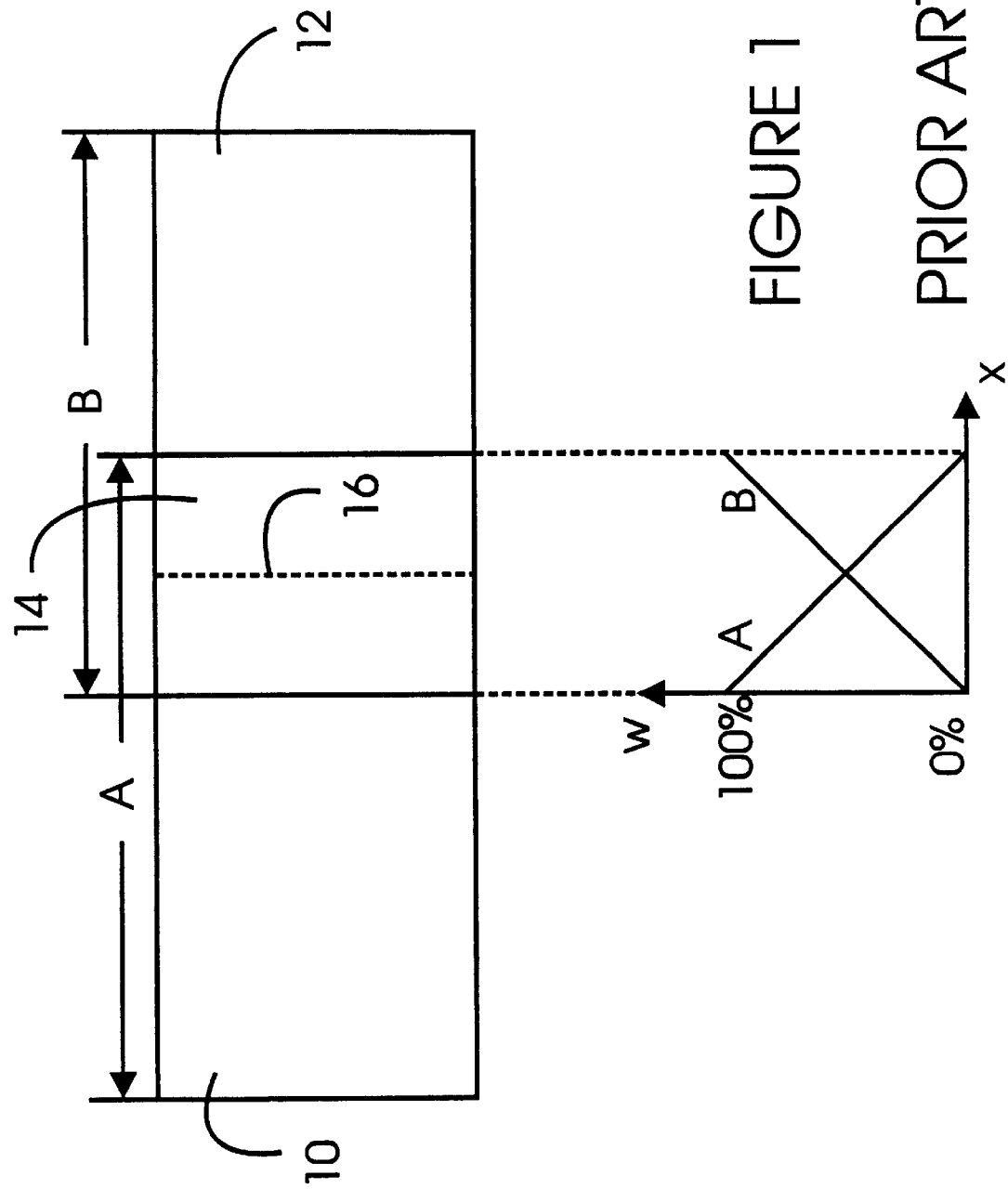
FIG. 1 is a prior art diagram illustrating the compositing of two images by feathering in accordance with the prior art.

Prior art FIG. 1 illustrates two images A and B, designated by reference numerals 10 and 12, respectively, and their overlap region, designated by reference numeral 14. The vertical line 16 in the middle of the overlap region corresponds to the "50/50 line," referred to hereinafter as the "splice line," where the weights used to combine image A and image B are both ½. The weight functions w(x) and 1−w(x) for image A and image B, respectively, are illustrated in FIG. 1.

A slight generalization of the above feathering, which is part of the present invention, involves explicit designation of the splice line, where the weight factor w is exactly ½. Whereas in the description above, the splice line falls in the horizontal middle of the rectangular overlap region, x=W/2, in this generalization the splice line can be placed anywhere along the horizontal extent of the rectangular overlap region. The weight factor w(x) in equation (1) varies from W=1 at the left end x=0 to w=½ at the splice line, and from w=½ at the splice line to w=0 at the right end x=W.

Figure 2A:
FIGS. 2A and 2B are two images to be composited, photographed under significantly different lighting conditions.
Figure 2B:
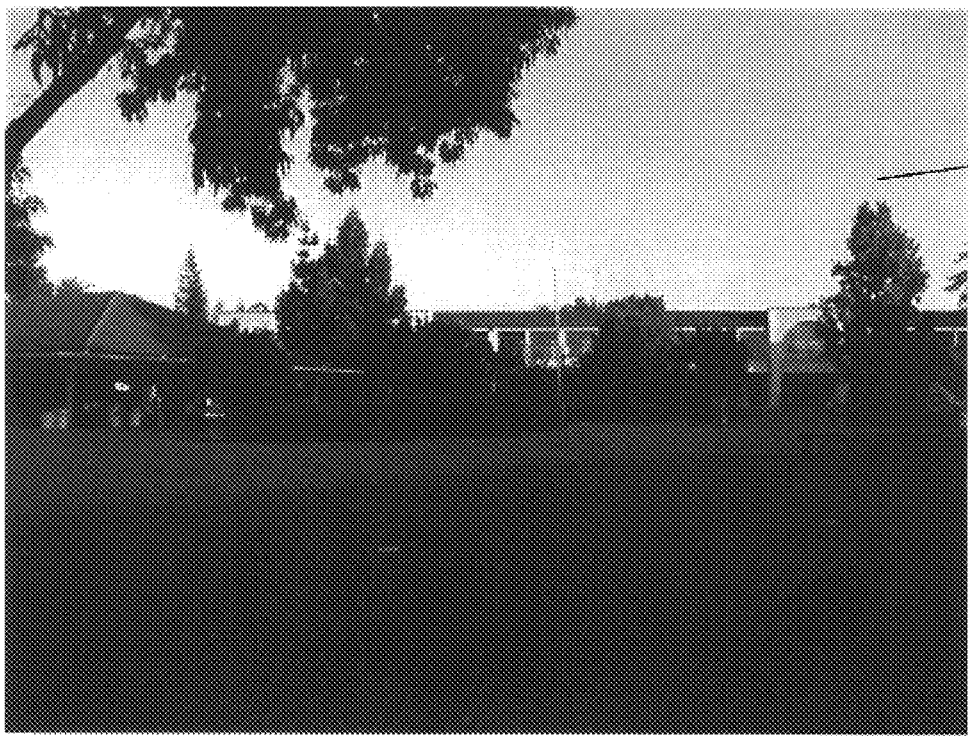

FIGS. 2A and 2B are two images, a left image 20, hereinafter denoted as "image A" and a right image 22, hereinafter denoted as "image B", which were taken under significantly different lighting conditions. In general, when two such images are taken under significantly different lighting conditions, and their overlap region is narrow, then the above feathering produces annoying artifacts of color bands at the overlap region. The present invention teaches a method to adjust the color of the images, based on pixel information from the overlap region, so as to bring the two images into line with one another. Specifically, brightness, contrast and gamma parameters, denoted by $\alpha$, $\beta$ and $\gamma$, respectively, are used to modify image color intensity according to the equation $$I' = \alpha + \beta \cdot I^\gamma. \tag{2}$$

For each of the two images, A and B, and for each of the color channels, optimal values of the parameters $\alpha$, $\beta$ and $\gamma$ are sought so as to minimize the effect of the lighting difference between the two images. Different optimal values $\alpha$, $\beta$ and $\gamma$ are used for each of the images and color channels, so that 18 parameters would be derived in the case of two images each having three color channels.

In a preferred embodiment, the present invention seeks to match as best as possible the color intensities of image A to an average image, using a least sum of squares error criterion, it being understood that any other error criterion could also be used. Specifically, it seeks to minimize the deviation between the color intensities of the adjusted image A $$\min_{\alpha,\beta,\gamma} \sum_{x,y} [I'_A(x, y) - I_{AB}(x, y)]^2 \tag{3}$$

for the three image A parameters, and $$\min_{\alpha,\beta,\gamma} \sum_{x,y} [I'_B(x, y) - I_{AB}(x, y)]^2$$

for the three image B parameters, where, $I_{AB}(x,y)$ is the average image of A and B, given by $$I_{AB}(x,y) = \frac{1}{2}[I_A(x,y) + I_B(x,y)] \tag{4}$$

and, according to equation (2), $I'_A(x,y)$ denotes $\alpha + \beta \cdot I_A^\gamma(x,y)$ and $I'_B(x,y)$ denotes $\alpha + \beta \cdot I_B^\gamma(x,y)$.

In a preferred embodiment of the present invention, the algorithm used to solve the minimization in equation (3) is to reduce the minimization problem from a three parameter problem (over $\alpha$, $\beta$ and $\gamma$) to a one parameter problem (over $\gamma$) by observing that for a fixed value of the parameter $\gamma$, one can find the optimal values of $\alpha$ and $\beta$ using the standard formulas for linear regression. The minimization in equation (3) thus transforms to the one parameter problem $$\min_\gamma \frac{F^2(\gamma)}{G(\lambda)}, \tag{5}$$

where the functions $F(\gamma)$ and $G(\gamma)$ are given by $$F(\gamma) = \frac{1}{N} \sum_{x,y} I_A^\gamma(x, y) I_{AB}(\gamma) - \frac{1}{N^2} \left[ \sum_{x,y} I_A^\gamma(x, y) \right] [I_{AB}(x, y)], \tag{6}$$

$$G(\gamma) = \frac{1}{N} \sum_{x,y} I_A^{2\gamma}(x, y) - \frac{1}{N^2} \left[ \sum_{x,y} I_A^\gamma(x, y) \right]^2, \tag{7}$$

and N is the total number of pixels in the pixel overlap region. In order to facilitate the computation of the functions $F(\gamma)$ and $G(\gamma)$, a table of values of $I^\gamma$ vs. $\gamma$ is pre-computed, since there are only 256 values for I. Once an optimal value of $\gamma$ is determined, the corresponding values of $\alpha$ and $\beta$ are given by $$\beta = \frac{F(\gamma)}{G(\gamma)}, \quad \alpha = \frac{1}{N} \sum_{x,y} [I_A^\gamma(x, y) - \beta I_{AB}(x, y)]. \tag{8}$$

It is readily apparent to those skilled in the art that an alternative to the expression in equation (3) is to use the expression $$\min_{\alpha,\beta,\gamma} \sum_{x,y} [I'_A(x, y) - I_B(x, y)]^2$$

to find optimal parameters $\alpha$, $\beta$ and $\gamma$ for the A image alone, and leave the B image unchanged (or vice versa). This would be advantageous in case the lighting in image A is undesired, but the lighting in image B is desired. It is also readily apparent to those skilled in the art that a weighting factor $\rho(x,y)$ can be incorporated into the expression to be minimized in equation (3). For example, it makes sense to weight pixel locations near the center of the overlap region more than others.

Once the optimal brightness, contrast and gamma parameters are determined, they are applied to the image. Strictly speaking, applying them to image A, for example, would entail modifying the color intensity from $I_A(x,y)$ to $I'_A(x,y) = \alpha + \beta \cdot I_A^\gamma(x,y)$. Equivalently, the intensity change $$\Delta I_A(x,y) = I'_A(x,y) - I_A(x,y) \tag{9}$$

is added to the original intensity $I_A(x,y)$.

In a preferred embodiment of the present invention, the increment $\Delta I_A(x,y)$ is multiplied by a weight factor, $r(x)$, which equals 1 inside the rectangular overlap region, but tapers off to zero horizontally, as the horizontal distance from the overlap region increases. Specifically, the application of the color modification parameters is given by $$I'_A(x,y) = I_A(x,y) + r(x) \cdot \Delta I_A(x,y) \tag{10}$$

where $r(x)=1$ inside the rectangular overlap region, and $r(x)$ tapers linearly off to $r(x)=0$ as x moves away from the overlap region. The rationale for this is that when multiple images A, B, C, . . . are stitched together, the stitching algorithm in the present invention proceeds by merging two images at a time. Thus it first merges the two images A and B into a combined image AB. It then merges the combined image AB with image C to form a longer combined image ABC, etc. Each successive stage merges two images, with the first one being a longer and longer image. It would not be wise to allow a small image, say C, to impact color intensity of a long image, say AB, throughout AB's entirety. Rather, the "zone of influence," over which image AB color intensity is modified, should be limited. For example, the zone of influence could be limited to the width of a single image.

Since the value of $\Delta I_A(x,y)$ in equation (9) above only depends on $I_A(x,y)$ and not on the specific location (x,y), a lookup table of values can be constructed which tabulate the value $\Delta I$ indexed by I. This enables fast modification of the image according to equation (10), avoiding the need to compute expressions using equation (2) repeatedly. Since there are typically only 256 distinct values of I, this lookup table is small.

Figure 3A:
FIGS. 3A and 3B are two corrected images, modified according to the present invention, corresponding respectively to FIGS. 2A and 2B.
Figure 3B:

FIGS. 3A and 3B are the corrected images 24 and 26, corresponding respectively to the images 20 and 22 of FIGS. 2A and 2B.

After each of the images A and B are adjusted to new images A' and B', the variation in lighting conditions has been reduced, and conventional feathering performs much better. The color banding artifact is less noticeable.

Figure 4:
FIG. 4 is a composite image obtained by feathering together FIGS. 3A and 3B.

FIG. 4 illustrates the composite image 28, obtained by feathering together the images 24 and 26 of FIGS. 3A and 3B.

A separate problem which arises in image compositing is "ghosting." The ghosting artifact is due to imperfect image alignment, and has the effect of leaving traces of objects adjacent their edges. As a simple example, suppose images A and B contain a common bright white square of size 1"×1" in their common overlap region, positioned over a black background. If the images are misaligned horizontally, say by 0.1", and then feathered according to equation (1), the bright square is stretched to a rectangle of size 1.1"×1". The two ends of this rectangle, of size 0.1"×1", are gray, since their pixel color values are formed by combining white pixels from image A with black pixels of image B, or vice versa. The middle of this rectangle, of size 0.9"×1, is white, since its pixel color values are formed by combining white pixels from image A with white pixels of image B. The overall appearance of the ends of the rectangle is that of a "ghost," or remnant of the white square, and serves to blur the sharp edge which should mark a sharp transition from white to black, but instead tapers from white to gray to black over a 0.1" width.

The present invention addresses the problem of ghosting by determining a different type of feathering region and splice line than conventional methods. The underlying idea is that regions of misalignment between images A and B can be identified by calculating their color differences $I'_A(x,y)-I'_B(x,y)$, and locating pixel locations (x,y) where this difference exceeds a pre-determined threshold value. Once these locations are determined, the objective is to determine a feathering region which does not contain any pixels where the images are significantly misaligned.

To accomplish this, the present invention first seeks a candidate "splice curve," which traverses the overlapping region downward from top to bottom without passing through any pixels where the images are misaligned (henceforth denoted "pixels of misalignment"), but is not necessarily a straight line. Typically, the splice line will be a downward-running curve, bending left and right in order to avoid pixels of misalignment.

A preferred algorithm for determining the splice curve is to use dynamic programming. Let $\epsilon(x,y)$ denote the image difference $$\epsilon(x,y)=|I'_A(x,y)-I'_B(x,y)|. \quad (11)$$

It can be appreciated by those skilled in the art that there are other metrics for image difference which could be used here instead. Then at each vertical level y, beginning at the top level y=0 and terminating at the bottom level y=H, where H is the height of the overlap region, the dynamic programming algorithm solves $$V_y(x) = \min_{\Delta x}[V_{y-1}(x + \Delta x) + \epsilon(x, y) + C(\Delta x)]. \quad (12)$$

Here $C(\Delta x)$ denotes a "bending cost," (or penalty) associated with the change in position from $(x+\Delta x, y-1)$ to (x,y), the idea being that the less bending, the smoother the splice line. The initial values $V_0(x)$ are taken to be $\epsilon(x,0)$. At each location (x,y), the minimization in equation (12) is then solved inductively, proceeding from y=0 to y=H, and the optimal value of $\Delta x$ is recorded. At the bottom level y=H, the location (x,y) with the least value $V_y(x)$ becomes the terminal point of the splice curve, and the recorded optimal values of $\Delta x$ are used to trace the curve back up to the top. In this way, the algorithm finds a splice curve with the least amount of misalignment along its path.

Once the splice curve is determined, the present invention proceeds to find the leftmost and rightmost bounding curves of the feathering region. In a preferred embodiment of the present invention, at each vertical position y one uses the location $(x_{SP}(y), y)$ on the splice curve and proceeds horizontally in both directions, leftward and rightward, as far as possible until either a misaligned pixel is met, or the end of the overlap region is reached. These leftward and rightward extreme points are then used to form initial candidates for the extreme leftmost and rightmost bounding curves.

Typically, however, these initial extreme curves are very erratic, with large oscillations. The present invention teaches a method to smooth these extreme curves. In a preferred embodiment, a dynamic programming algorithm is again used to find optimal downward running curves which are as far removed from the splice line as possible, without extending beyond the initial extreme curves described above. Specifically, illustrating the calculation for the leftmost curve, the analogue of equation (12) becomes $$V_y(x) = \min_{\Delta x}[V_{y-1}(x + \Delta x) - D_y(x) + C(\Delta x)], \quad (13)$$

where $D_y(x)$ denotes the horizontal distance $|x_{SP}(y)-x|$ between the location (x,y) and the splice line. In order to avoid extending beyond the initial extreme curve, $D_y(x)$ is set to a large number ("infinity") if the location (x,y) is to the left of the leftmost curve or to the right of the splice curve. Thus the algorithm prefers larger distances over smaller ones. As above, the "bending cost" $C(\Delta x)$ is also included, so as to favor smooth curves. The initial value is set to $V_0(x)=-D_0(x)$. Determination of the optimal leftmost curve is done as described above; namely, by tracking back inductively from the bottom point (x,y) which has the least value of $V_y(x)$. The leftmost curve calculated in this fashion serves as the left boundary of the feathering region.

Calculation of the rightmost curve proceeds in an analogous fashion, and the optimal rightmost curve serves as the right boundary of the feathering region. In a preferred embodiment of the present invention, the splice curve is modified to lie in the middle of the leftmost and rightmost curve, after they are determined. Specifically, if the points on the leftmost and rightmost curves are denoted by $(x_L(y), y)$ and $(x_R(y), y)$, respectively, and if the points on the splice curve are denoted by $(x_{SP}(y),y)$, then the preferred embodiment modifies the values of $x_{SP}$ to be $$x_{SP}(y)=\frac{1}{2}[x_L(y)+x_R(y)]. \tag{14}$$

The feathering region is taken to be the region between the leftmost and rightmost bounding curves. Application of the feathering then proceeds according to the following modified version of equation (1):

$$I_{AB}(x,y)=w_y(x)I_A(x,y)+[1-w_y(x)]I_B(x,y) \tag{15}$$

The weighting factor $w_y(x)$ now depends on both x and y, and is given by $$w_y(x) = \begin{cases} 1 - \frac{1}{2}\frac{x_{SP}(y) - x}{x_{SP}(y) - x_L(y)}, & x_L(y) \le x \le x_{SP}(y) \\ \frac{1}{2}\frac{x - x_{SP}(y)}{x_R(y) - x_{SP}(y)}, & x_{SP}(y) \le x \le x_R(y) \end{cases} \tag{16}$$

That is, the weighting factor varies linearly in the horizontal direction (x) from w=1 along the leftmost curve to w=½ along the splice curve, and then from w=½ along the splice curve to w=0 along the rightmost curve. Under the condition (14) this simplifies to $$w_y(x) = \frac{x_R(y) - x}{x_R(y) - x_L(y)}, \quad x_L(y) \le x \le x_R(y) \tag{17}$$

Outside of the splice region the individual images are copies—image A to the left, and image B to the right.

Figure 5A:
FIG. 5A is a composite image obtained by prior art feathering exhibiting ghosting.
Figure 5B:
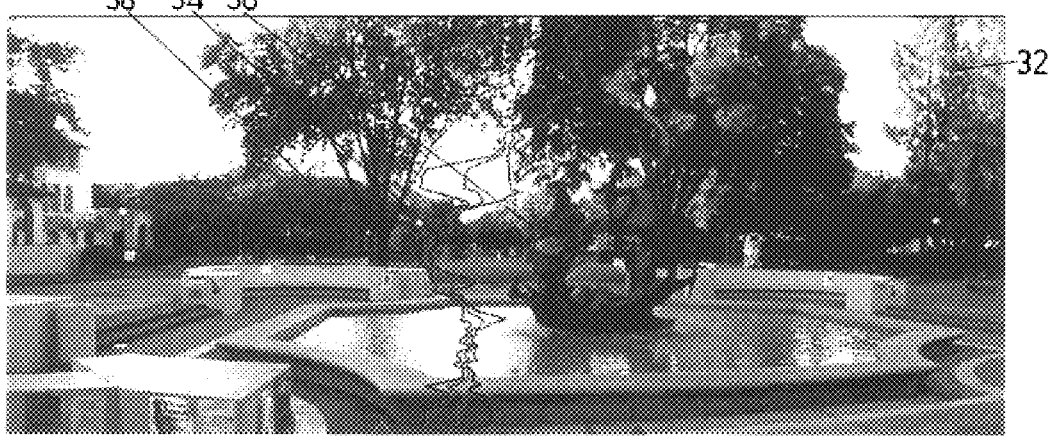
FIG. 5B is a composite image obtained in accordance with the present invention and illustrating curves used in accordance with the present invention.

FIG. 5A is a prior art feathered image 30 exhibiting ghosting, using prior art feathering. FIG. 5B is a feathered image 32 using the present invention, showing how the ghosting artifact has been eliminated. Also appearing in FIG. 5B is the splice line 34, shown in red, and the left and right curves 36 and 38, respectively, shown in blue, which form the boundaries of the feathering region. It is noted that the feathering region avoids any areas of mis-registration, where ghosting occurs in FIG. 5A.

It can be appreciated from the above discussion that in order for the present invention to succeed in overcoming ghosting there must exist a feathering region which avoids areas of significant mis-registration within the overlap region. If there were a horizontal line running across the overlap region and if the two images were mis-aligned vertically, then there would be an entire horizontal line of mis-registered pixels running across the overlap region. In this case no feathering region would exist which avoids this line, since the splice line must cut across it. This is illustrated in FIG. 6A, which shows a left image 40 and a right image 42 which are mis-aligned vertically. The overlap region indicates a broken line 44 within the red circle. FIG. 6B illustrates an enlargement 46 of the overlap region, indicating the ghosting effect surrounding the break in the line.

The present invention corrects this by pre-warping one of the images, say image A, as a first stage, prior to the color correction and feathering processing described above. The objective is to adjust the pixel color values of image A vertically up or down so as to bring the images into vertical alignment. The present invention seeks to find a vertical displacement d=d(x,y) at each pixel location (x,y) within image A, so that if the pixel color value of image A at each location (x,y) is replaced with its pixel color value at (x,y+d), then image A and image B are well-aligned vertically within the overlap region. Referring to FIG. 6A, the objective would be to raise the image on the left so as to straighten out the broken line.

In a preferred embodiment the present invention proceeds by first determining the displacements d along selected vertical lines within the overlap region having a fixed x position. Positive displacements represent a downward shift of image A and negative displacements represent an upward shift of image A. Considering such a line positioned at $x=x_1$, for each vertical index y and for each displacement d, the invention calculates a goodness-of-fit along the line between image B and the shifted image A, shifted downward by d. Precisely, a fixed radius r is chosen, and a centered vector of samples $I_A(x,y+d+h)$, $-r \le h \le r$ from image A is correlated with a corresponding centered vector of samples $I_B(x,y+h)$, $-r \le h \le r$ from image B. The correlation coefficient $\rho=\rho(y,d)$ is recorded. Thus it can be seen that a two-dimensional table is constructed with values $\rho$ for each pair of indices y and d.

Once the two-dimensional table is constructed as above, dynamic programming is used to find an optimal smooth path (y,d,(y)) running through the table from the bottom of the line, y=0, to the top of the line, y=H, where H is the height of the overlap region, as above with reference to the discussion of equation (12). Smoothness of the path is important to ensure that the warping does not dramatically distort image A.

The appropriate dynamic programming formulation is $$V_y(d) = \max_{\Delta d}[V_{y-1}(d + \Delta d) + \rho(y, d) + C(\Delta d)] \tag{18}$$

where, as above, $C(\Delta d)$ denotes a "bending cost," (or penalty) associated with the change in vertical distortion from d at height y−1 to d+Δd at height y. The initial values $V_0(d)$ are taken as $\rho(0,d)$. The maximization in equation (18) is solved recursively for each height y=1,2, . . . ,H. At each height the optimal value of Δd is recorded. After the maximizations are completed, these recorded values of Δd enable the program to trace back and find the corresponding values $d_1=d_1(y)$ for each height y.

Unless there is a further constraint imposed in equation (18), there is a possibility that the optimal distortions $d_1(y)$ could result in a warping that "folds" the image. Folding occurs when pixels which lie below one another are displaced to lie above one another. For example, suppose the pixel at height y=4 gets displaced to height y=7 (by a displacement $d_1(4)=3$), and the pixel at height y=5 gets displaced to height y=6 (by a displacement $d_1(5)=1$). Then the order has been flipped, and the image has been folded over itself. This is clearly undesirable. In order to avoid this folding, it can be seen that the displaced heights y+d(y) are required to be monotonic (i.e. non-decreasing). In turn, it can be seen that to ensure this it suffices to restrict $$\Delta d \ge -1 \tag{19}$$

in the maximization (18).

The above discussion explains how to construct a sequence of vertical displacements $d_1(y)$ along a vertical line $x=x_1$. In a preferred embodiment of the present invention, this is repeated for multiple vertical lines, $x=x_k$, $1 \le k \le n$ situated at multiple locations within the overlap region, where n denotes the number of such lines. For each such line $x=x_k$ a corresponding sequence of vertical displacements $d_k(y)$ is determined. These determine the vertical distortions for image A along the selected lines. At the left and right sides of the image A, x=0 and x=R, respectively, where R denotes the position of the right side (i.e. the width) of image A, the displacements are set to zero, so as to force no distortion at the ends. This is indicated by defining $d_0(y)=d_{n+1}(y)=0$, $0<y<H$, corresponding to the left and right positions $x_0=0$ and $x_{n+1}=R$, respectively.

At positions x located between and outside of the selected lines, the displacements d(x,y) are determined by linear interpolation from the displacements already calculated along the selected lines. Specifically, if x is between $x_k$ and $x_{k+1}$, then d(x,y) is calculated as $$d(x, y) = \frac{x_{k+1} - x}{x_{k+1} - x_k} d_k(y) + \frac{x - x_k}{x_{k+1} - x_k} d_{k+1}(y). \quad (20)$$

The above warping calculation is not performed for each individual color channel. Rather, it is performed for a single luminance channel, such as I=0.3R+0.6G +0.1B, for example.

After the two-dimensional displacements d(x,y) are calculated, they are applied to image A. Specifically, at each pixel location (x,y), the modified color value is set to the original color value at pixel location (x,y+d(x,y)). FIG. 6C is a composite image 48 obtained by feathering the modified image A with the original image B. As can be seen, the vertical mis-alignment has been eliminated. FIG. 6D is an enlargement 50 of the frame in FIG. 6C, showing that the two images have been brought into good alignment, as compared with FIG. 6B.

It is readily apparent to anyone skilled in the art that the present invention may be used to distort image B to align it with image A, rather than distort image A as described above. Alternatively, both images could be distorted to bring them into line with a common image, such as their average, similar to what was done in equation (3) above.

Figures 7A, 7B:
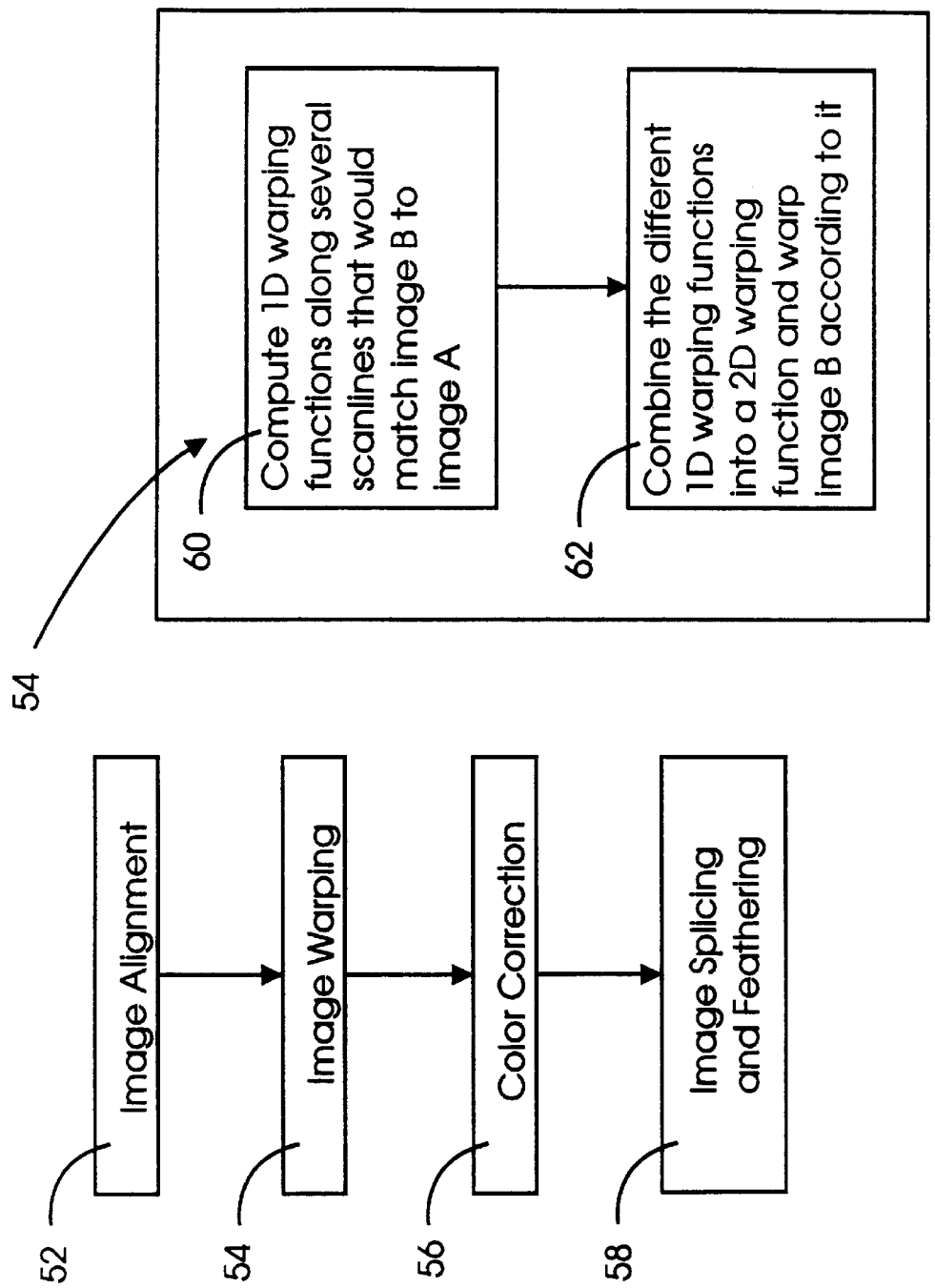
FIGS. 7A–7E are simplified flow charts of a preferred embodiment of the present invention.

FIGS. 7A–7E provide simplified flow charts of a preferred embodiment of the image alignment system of the present invention, for compositing two overlapping images. FIG. 7A illustrates the global steps 52, 54, 56 and 58. Step 52 aligns the two images so as to bring them into registration in the overlap region. Step 54 carries out the image warping to eliminate vertical misalignment. Step 56 carries out the color correction to each of the images, based on information from the overlap region. Step 58 carries out the determination of the splicing line and the feathering region, and the actual feathering of the two images.

FIG. 7B illustrates the individual steps 60 and 62 used to carry out the image warping step 54. Step 60 computes several one-dimensional warping functions, and step 62 combines them into a two-dimensional warping function, and carries out the warping.

Figure 7C:
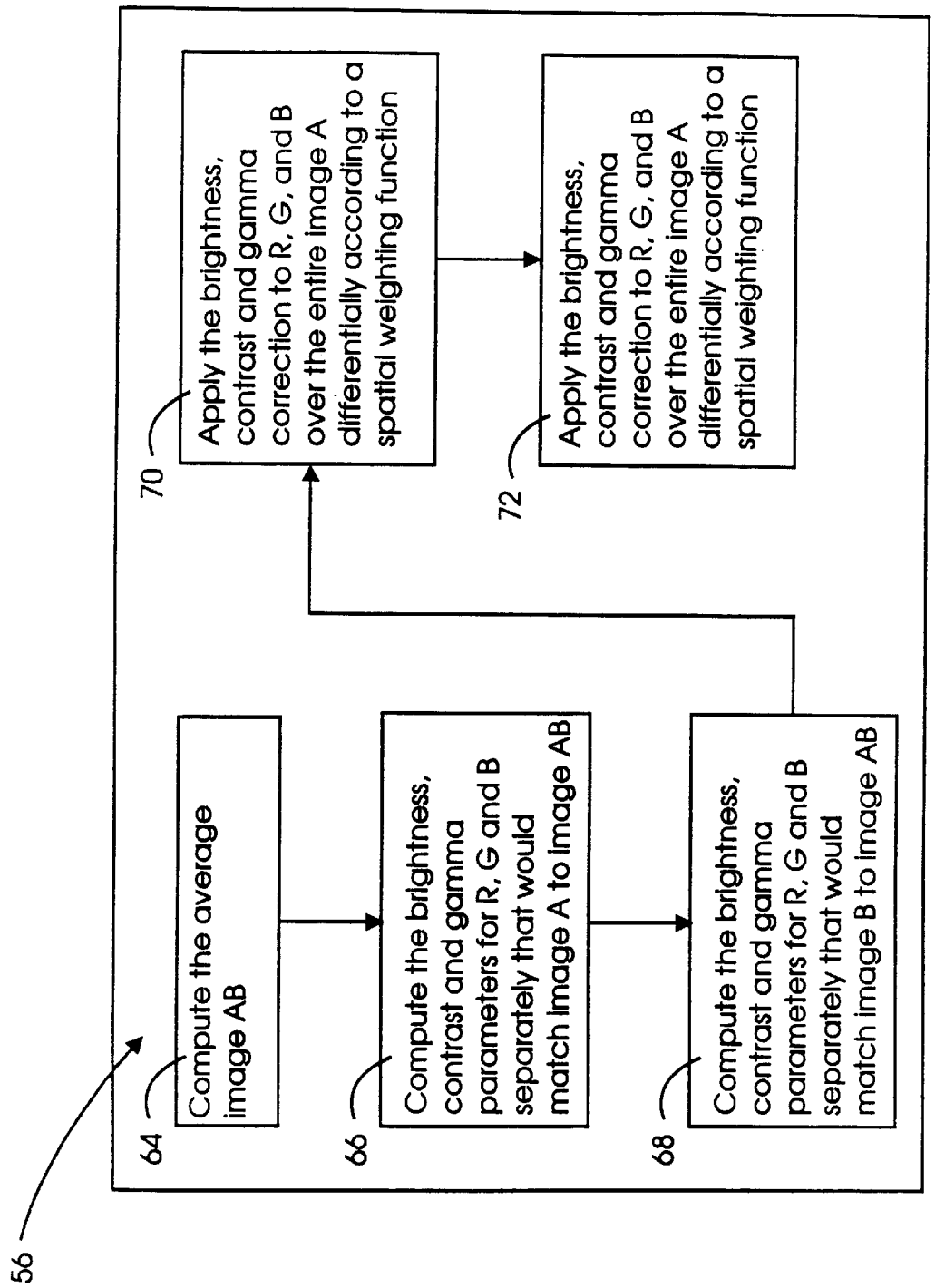

FIG. 7C illustrates the individual steps 64, 66, 68, 70 and 72, used to carry out the color correction step 56. Step 64 computes the average image. Step 66 computes the optimal brightness, contrast and gamma factors which match the first image to the average image, for each of the color channels. Step 68 computes the optimal brightness, contrast and gamma factors which match the second image to the average image, for each of the color channels. Step 70 applies modifies the first image by applying the brightness, contrast and gamma correction, based on the factors computed in step 66. Step 72 modifies the second image by applying the brightness, contrast and gamma correction, based on the factors computed in step 68.

Figure 7E:
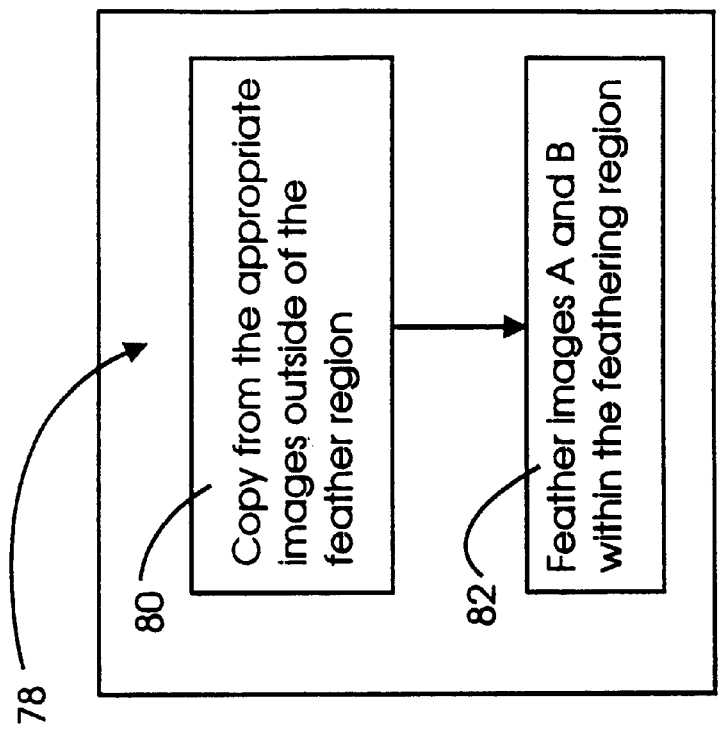
Figure 7D:
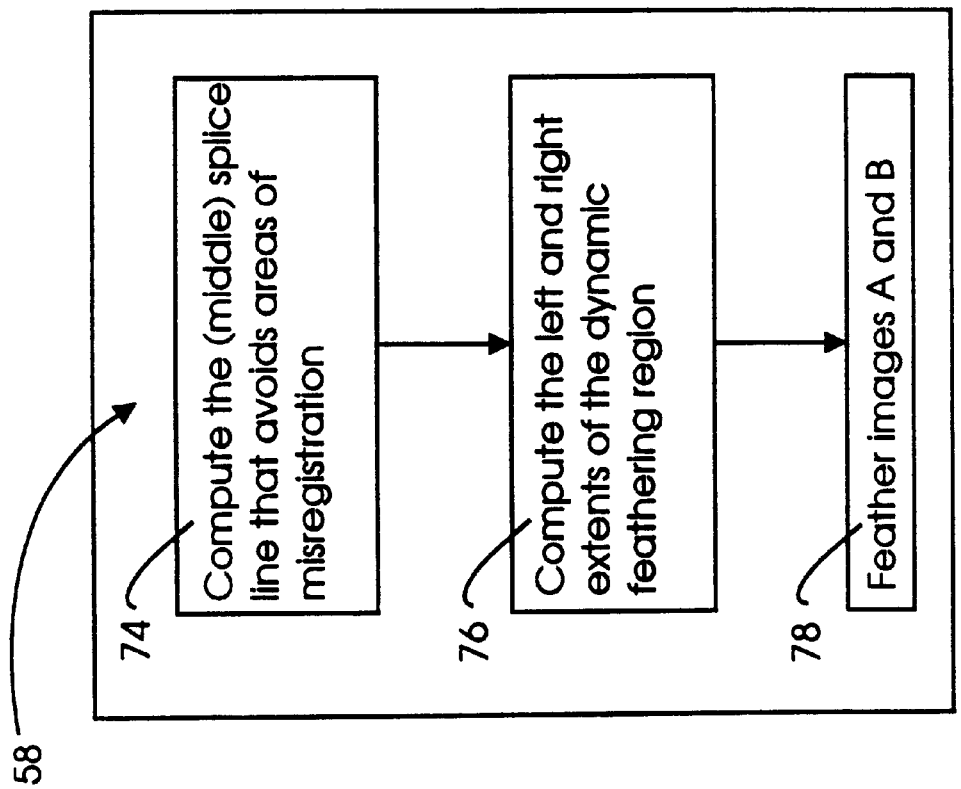

FIG. 7D illustrates the individual steps 74, 76 and 78 used to carry out the splicing and feathering step 58. Step 74 computes the (middle) splice line that avoids areas of mis-registration. Step 76 computes the left and right curves which bound the feathering region. Step 78 feathers the two images together.

FIG. 7E illustrates the individual steps 80 and 82 used to carry out the feathering step 78. Step 80 copies the left image to the left of the feathering region and the right image to the right of the feathering region. Step 82 feathers the images together within the feathering region.

It will be appreciated by persons skilled in the art that the present invention is not limited to what has been particularly shown and described hereinabove. Rather the scope of the present invention includes both combinations and subcombinations of the features described hereinabove, as well as modifications and extensions thereof which would occur to persons skilled in the art reading the foregoing description and which are not in the prior art.

What is claimed is:

1. A method for aligning a first digital image with a second digital image which overlaps with it in an overlapping pixel region, comprising:

determining a two-dimensional table of strictly vertical pixel displacements for each pixel location in said first image, wherein the strictly vertical pixel displacement for a pixel location, P, is constrained so as not to be more than one unit smaller than the strictly vertical pixel displacement for a pixel location that is one unit directly below P; and replacing the color value in said first image at each pixel location in said first image with the color value of a pixel displaced from said pixel location by said strictly vertical pixel displacement for said pixel location.

2. A method according to claim 1 and wherein said strictly vertical pixel displacements are constrained to be zero at at least one side of said first image.

3. A method according to claim 1 and wherein said determining comprises:

calculating strictly vertical pixel displacements along multiple vertical lines of pixel locations within said overlapping pixel region; and interpolating horizontally to calculate pixel displacements at pixel locations not situated on said vertical lines.

4. A method according to claim 1 and wherein said strictly vertical pixel displacements are determined by using a dynamic programming optimization algorithm.

5. A system for aligning a first digital image with a second digital image which overlaps with it in an overlapping pixel region, comprising:

a processor determining a two-dimensional table of strictly vertical pixel displacements for each pixel location in said first image, wherein the strictly vertical pixel displacement for a pixel location, P, is constrained so as not to be more than one unit smaller than the strictly vertical pixel displacement for a pixel location that is one unit directly below P; and an image writer replacing the color value in said first image at each pixel location in said first image with the color value of a pixel displaced from said pixel location by said strictly vertical pixel displacement for said pixel location.

6. A system according to claim 5 and wherein said strictly vertical pixel displacements are constrained to be zero at at least one side of said first image.

7. A system according to claim 5 and wherein said processor comprises:

a calculator calculating strictly vertical pixel displacements along multiple vertical lines of pixel locations within said overlapping pixel region; and an interpolator interpolating horizontally to calculate pixel displacements at pixel locations not situated on said vertical lines.

8. A system according to claim 5 and wherein said processor operates by using a dynamic programming optimization algorithm.

9. A method according to claim 1 further comprising calculating, at each pixel location in the first image, for each candidate displacement for a strictly vertical displacement for the pixel location, a measure of correlation between the first image shifted by the candidate displacement and the second image, in a neighborhood of the pixel location.

10. A method according to claim 1 wherein said determining is based on luminance values at pixel locations of the first and second digital images.

11. A system according to claim 5 further comprising a calculator calculating, at each pixel location in the first image, for each candidate displacement for a strictly vertical displacement for the pixel location, a measure of correlation between the first image shifted by the candidate displacement and the second image, in a neighborhood of the pixel location.

12. A system according to claim 5 wherein said processor determines strictly vertical pixel displacements based on luminance values at pixel locations of the first and second digital images.

* * * * *